United States Patent

Kumada

[11] Patent Number: 6,048,116
[45] Date of Patent: Apr. 11, 2000

[54] METHOD AND APPARATUS FOR DRAWING CHARACTERS FOR DISPLAY IN A DRAFT MODE AND A HIGH RESOLUTION MODE

[75] Inventor: Shuichi Kumada, Yokohama, Japan

[73] Assignee: Canon Kabushiki Kaisha, Tokyo, Japan

[21] Appl. No.: 07/866,273

[22] Filed: Apr. 13, 1992

Related U.S. Application Data

[63] Continuation of application No. 07/489,278, Mar. 6, 1990, abandoned.

[30] Foreign Application Priority Data

Mar. 8, 1989 [JP] Japan .................................. 1-057308

[51] Int. Cl.[7] ........................................... B41J 11/44
[52] U.S. Cl. ............................... 400/76; 400/70; 400/61
[58] Field of Search ............................. 400/121, 76, 70, 400/61; 395/102, 109, 110, 128, 129, 150, 151; 340/728, 730, 731, 735, 748; 382/241, 242, 298, 299; 345/132, 144

[56] References Cited

U.S. PATENT DOCUMENTS

| | | | |
|---|---|---|---|
| 4,578,689 | 3/1986 | Spencer et al. | 346/160 |
| 4,623,242 | 11/1986 | Hayashi et al. | 355/14 R |
| 4,627,002 | 12/1986 | Blum et al. | 364/519 |
| 4,675,743 | 6/1987 | Riseman et al. | 358/263 |
| 4,675,908 | 6/1987 | Saito | 382/47 |
| 4,751,507 | 6/1988 | Hama | 340/731 |
| 4,771,474 | 9/1988 | Takashima | 382/56 |
| 4,878,250 | 10/1989 | Kotora | 382/47 |
| 4,891,634 | 1/1990 | Ina | 340/731 |
| 4,907,282 | 3/1990 | Daly et al. | 382/9 |
| 4,943,935 | 7/1990 | Sato | 340/748 |
| 5,073,953 | 12/1991 | Kawanoto | 382/56 |
| 5,086,481 | 2/1992 | Yoshida | 340/728 |
| 5,091,976 | 2/1992 | Murayama | 382/242 |
| 5,233,671 | 8/1993 | Murayama | 382/242 |
| 5,309,521 | 5/1994 | Matsukawa | 382/242 |

Primary Examiner—Edgar Burr
Assistant Examiner—Charles H. Nolan, Jr.
Attorney, Agent, or Firm—Fitzpatrick Cella Harper & Scinto

[57] ABSTRACT

There is provided an output apparatus for outputting an image pattern by dots on the basis of a vector font. The apparatus comprises: a memory to store coordinate point data indicative of an outline of a pattern; a first mode to arrange into dots on the basis of the coordinate point data stored in the memory; a second mode to reduce the number of outline points than that in the first mode and to arrange into dots; a mode indicating device to indicate the first or second mode; and an output device to output dots in accordance with the first or second mode on the basis of the indication from the mode indicating device. By properly selecting the first or second mode, an image pattern can be displayed or printed by dots at a desired quality and a desired speed on the basis of the vector font.

18 Claims, 6 Drawing Sheets

| $x_0$ | $y_0$ |
|---|---|
| $x_1$ | $y_1$ |
| $x_2$ | $y_2$ |
| ⋮ | ⋮ |
| $x_8$ | $y_8$ |
| $x_9$ | $y_9$ |
| $x_{10}$ | $y_{10}$ |
| $x_{11}$ | $y_{11}$ |
| $x_{12}$ | $y_{12}$ |
| ⋮ | ⋮ |
| $x_{16}$ | $y_{16}$ |
| $x_{17}$ | $y_{17}$ |

METHOD AND APPARATUS FOR DRAWING CHARACTERS FOR DISPLAY IN A DRAFT MODE AND A HIGH RESOLUTION MODE

This application is a continuation of application Ser. No. 07/489,278 filed Mar. 6, 1990, now abandoned.

BACKGROUND OF THE INVENTION

1. Field of the Invention

The present invention relates to an output apparatus for outputting dots on the basis of a vector font.

2. Related Background Art

Hitherto, in a printing apparatus which can print a vector font, the vector font is virtually designed by the matrix coordinate system of 500×500 or the like and the number of outline points of the vector font which are necessary to arrange into dots are fixedly thinned out (for instance, corresponding to 256×256) and the resultant outline points are output.

However, in the case of printing a vector font, the conventional apparatus has the following drawbacks.

When the number of outline points of the vector font increases, a burden by the coordinate calculation and a complicated algorithm increases, so that there is a problem such that it takes a long processing time.

SUMMARY OF THE INVENTION

It is an object of the present invention to provide an output apparatus having a first mode to properly control the number of outline points of a vector font and to arrange into dots and a second mode to reduce the number of outline points of the vector font than that in the first print mode and to arrange into dots, wherein by selecting each mode, the dots can be output at a desired speed and a desired print quality on the basis of the vector font.

DETAILED DESCRIPTION OF THE PREFERRED EMBODIMENTS

Embodiment

An embodiment according to the present invention will be described in detail hereinbelow with reference to the drawings.

Figure 1:
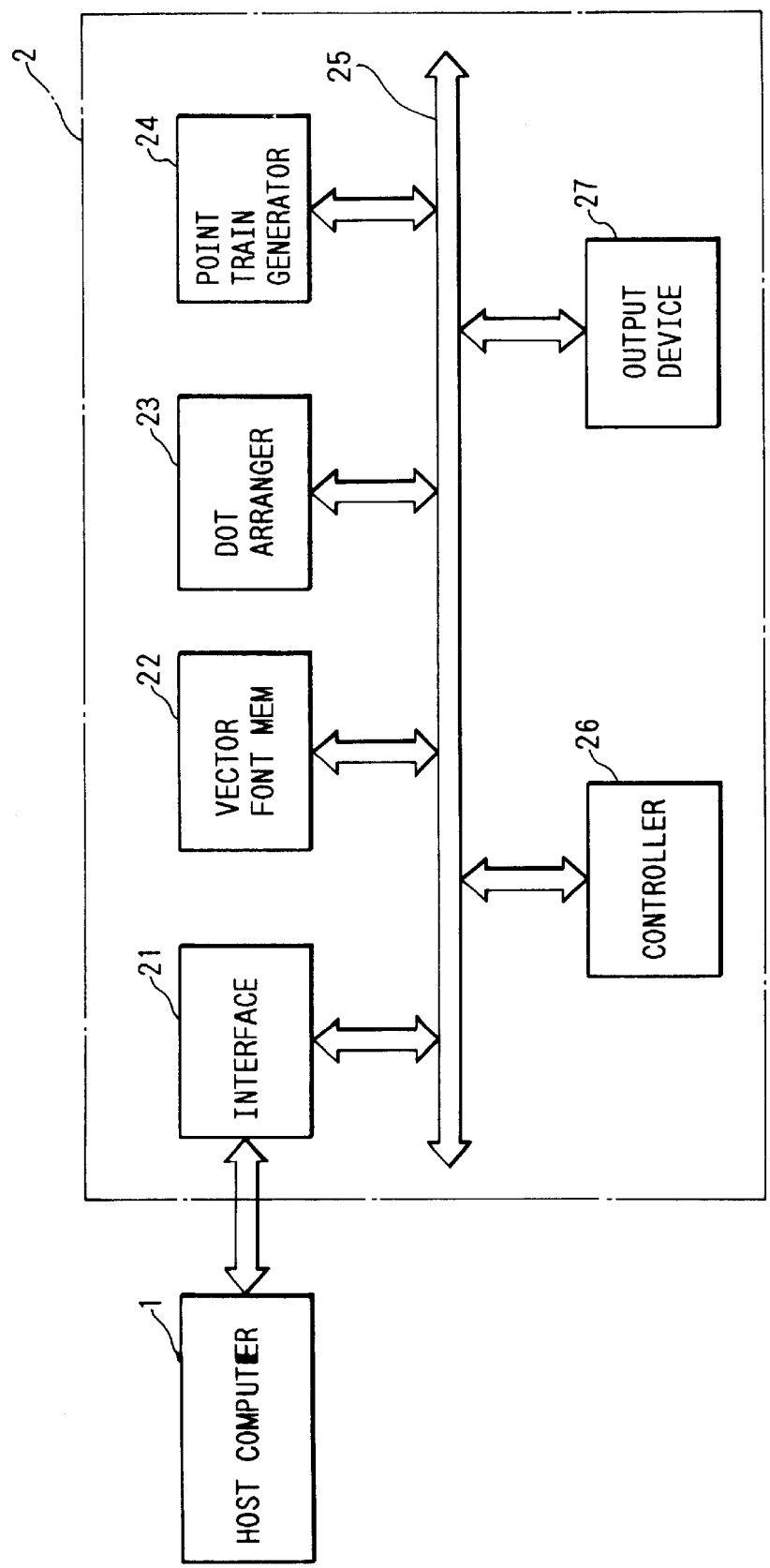
FIG. 1 is a block diagram showing a construction of a printing apparatus in an embodiment according to the present invention.

FIG. 1 is a block diagram showing a construction of an output apparatus, for instance, a printing apparatus of the embodiment according to the invention.

In the diagram, reference numeral 1 denotes a host computer for outputting print data and a print command from the outside. Reference numeral 2 indicates a printer of the embodiment.

The printer 2 is constructed by a microprocessor including a RAM and a ROM. Programs shown by flowcharts, which will be explained hereinlater, are stored in the printer. The printer 2 comprises: an interface 21 to transmit and receive data to/from the host computer 1; a vector font memory 22 in which information regarding vector fonts are stored; a dot arranger 23 to arrange the vector font into dots; a point train generator 24 to generate a train of points of a curve portion of an outline of the vector font; a data bus 25; a controller 26 to execute the printing process and the control of the whole apparatus; and an output device 27 to form a permanent visible image onto a paper on the basis of data which was arranged into dots.

Figures 2, 3:
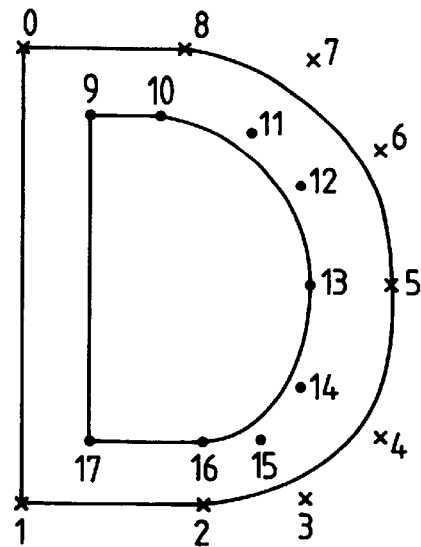
FIG. 2 is a diagram showing an example of control points of a vector font.
FIG. 3 is a diagram showing a control point table in which the coordinates of the control points in FIG. 2 are stored.

FIG. 2 shows control points to generate a point train of an outline of a vector font. The diagram relates to the case of a character "D". X indicates control points of the outside outline. • represents control points of the inside outline. Those control points are numbered by ø to 17, respectively.

FIG. 3 shows a control point table in which the coordinate positions of the control points shown in FIG. 2 are stored. The table is stored in the vector font memory 22. In addition to the control point table, information indicative of the starts and ends of curves and the like are included in the memory 22. The control point table can be considered as a part of such information.

Figure 4:
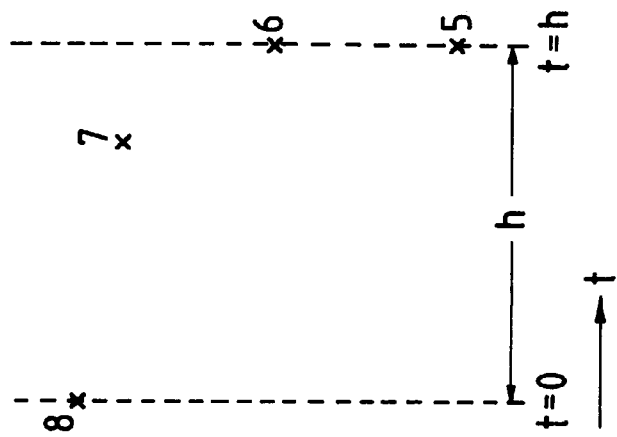
FIG. 4 is a diagram showing an example in the case of generating a train of points among the control points in FIG. 2.

FIG. 4 shows the conditions of an example in the case where a point train was generated among the control points 5 to 8 in FIG. 2.

It is assumed that the curve among the control points 5 to 8 is approximated by a function $$P(t)=at^3+bt^2+ct+d$$

(where, a, b, c and d are constants) of t and the interval between t and the control points 5 to 8 is set to h (constant).

Figure 5B:
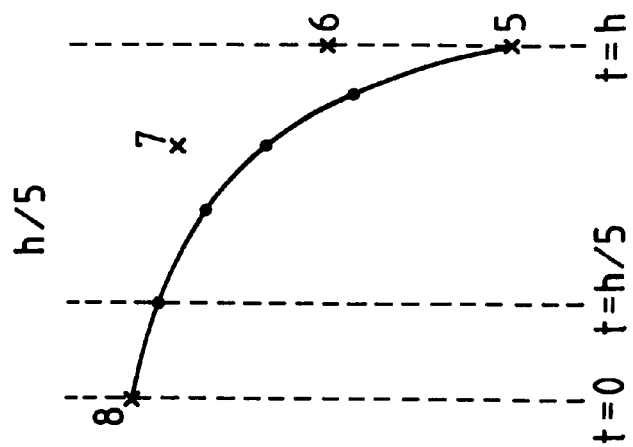
FIGS. 5A and 5B are diagrams showing an example in the case where a sampling width is set under the conditions of FIG. 4 and dot train is generated among the control points.
Figure 5A:
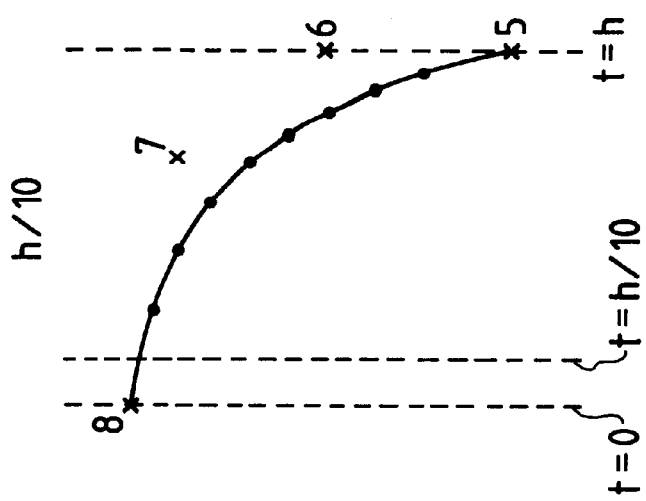

FIGS. 5A and 5B show an example in the case where sampling width (between t=0 to t=h) is set and a point train was generated among the control points 5 to 8 under the conditions of FIG. 4.

FIG. 5A relates to the case where the sampling width is set to h/10. As shown in the diagram, a train of nine points are generated.

FIG. 5B relates to the case where the sampling width is set to h/5. As shown in the diagram, a train of four points are generated.

As mentioned above, by changing the sampling width, the number of train of points to be generated can be controlled.

In the printing apparatus, in response to a command from the host computer 1, a proper number of points (outline points of the vector font) are generated from the information of the control points of the vector font. On the basis of the train of points, either a standard mode to arrange a font into dots or a draft mode to reduce the number of points to be generated than that in the standard print mode and to arrange the font into dots is selected on the basis of the reduced number of points and the dots are printed by the output device 27.

Figure 6:
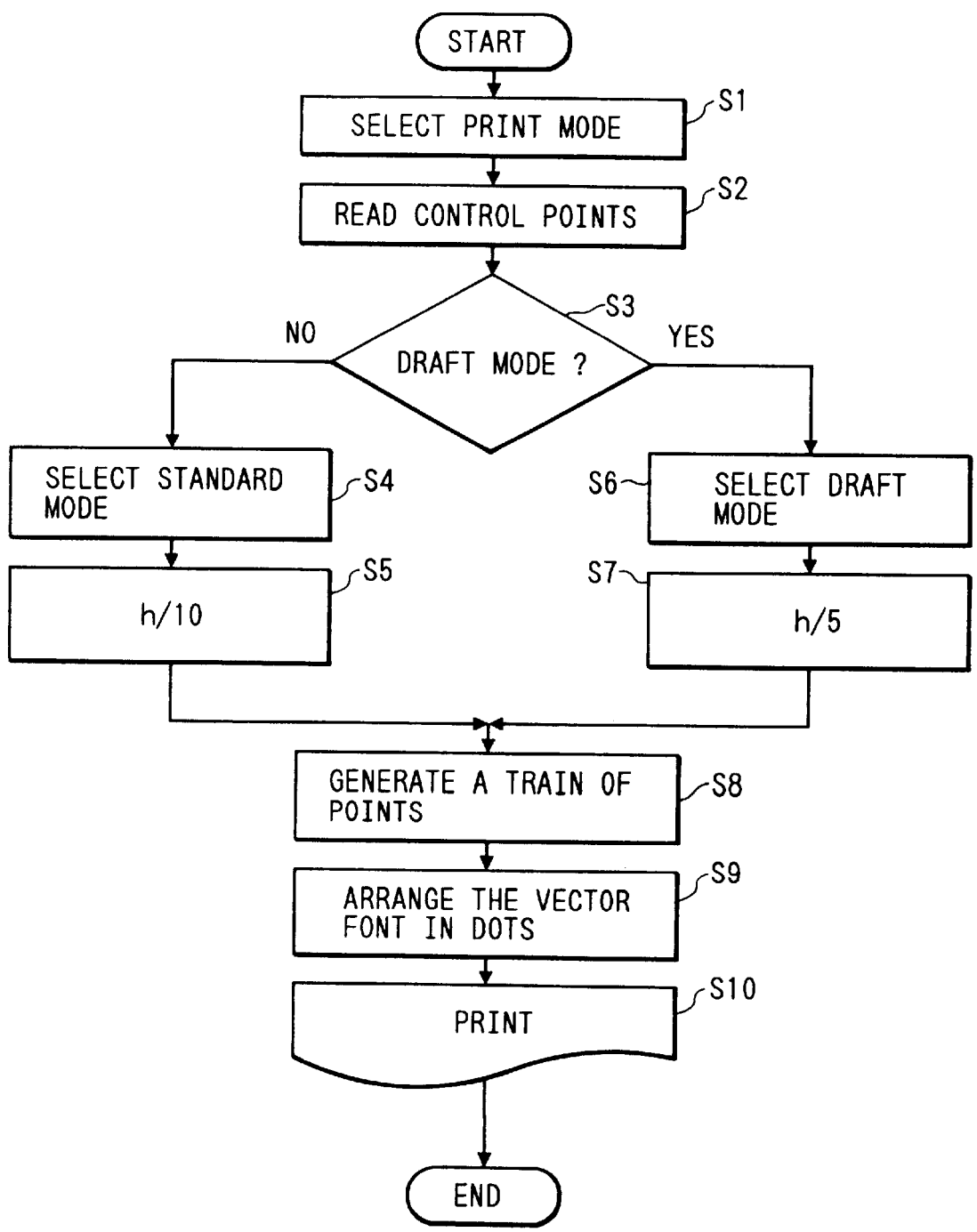
FIG. 6 is a flowchart showing the operation in the case of printing a vector font (character "D") by selecting a proper mode.

FIG. 6 is a flowchart showing the operation in the case of printing vector font (character "D") by selecting the mode as mentioned above.

First, in step S1, an operating mode is selected by the host computer 1 and step S2 follows.

In step S2, the control point table (FIG. 3) is extracted from the vector font memory 22 and the control points are read out. In the next step S3, the mode selected in step S1 is checked.

If the standard print mode has been selected (step S4), step S5 follows and the sampling width for generation of a point train of a ternary spline curve is set to h/10 (h is a constant). Then, step S8 follows. (FIGS. 4 and 5A)

If the draft mode has been selected (step S6), step S7 follows and a sampling width for generation of a point train of a ternary spline curve is set to h/5 (h is a constant). Then, step S8 follows. (FIGS. 4 and 5B)

In step S8, the point train of the outline curve portion of the vector font is generated on the basis of the control points and sampling width which were obtained in step S2. Then, step S9 follows.

On the basis of the point train obtained in step S9, the vector font is arranged into dots by the dot arranger 23 and is printed in step S10.

As mentioned above, by changing the number of points (outline points of the vector font) which are generated on the basis of the control points, the printing process can be simplified.

Another embodiment

Although the above embodiment has been described with respect to the example of the generation of a point train by the ternary spline curve, the invention can be also applied to other point train generating systems which can change the number of points which are generated by changing the sampling width.

Although the above embodiment has been described with respect to the example of the selection of the print mode from the host computer, the print mode can be also selected from the operation panel of the printer.

On the other hand, although the above embodiment has been described with respect to the printing apparatus, the invention is not limited to it. Even if the output device 27 is regarded as a display device, the spirit of the invention is not lost.

In the case where both the printing apparatus and the display device are connected to the data bus 25, it is also possible to construct the system in a manner such that, the output is automatically executed in the first mode for the print or the processing routine is automatically advanced to FIG. 6, while the output is performed in the second mode for display.

Furthermore, means for switching whether the dot information obtained in the first mode is thinned out and output in a form of dots or the dot information which was thinned out in the second mode is derived can be also provided in the host computer or on the panel of the apparatus in addition to the above descriptions.

Figure 7:
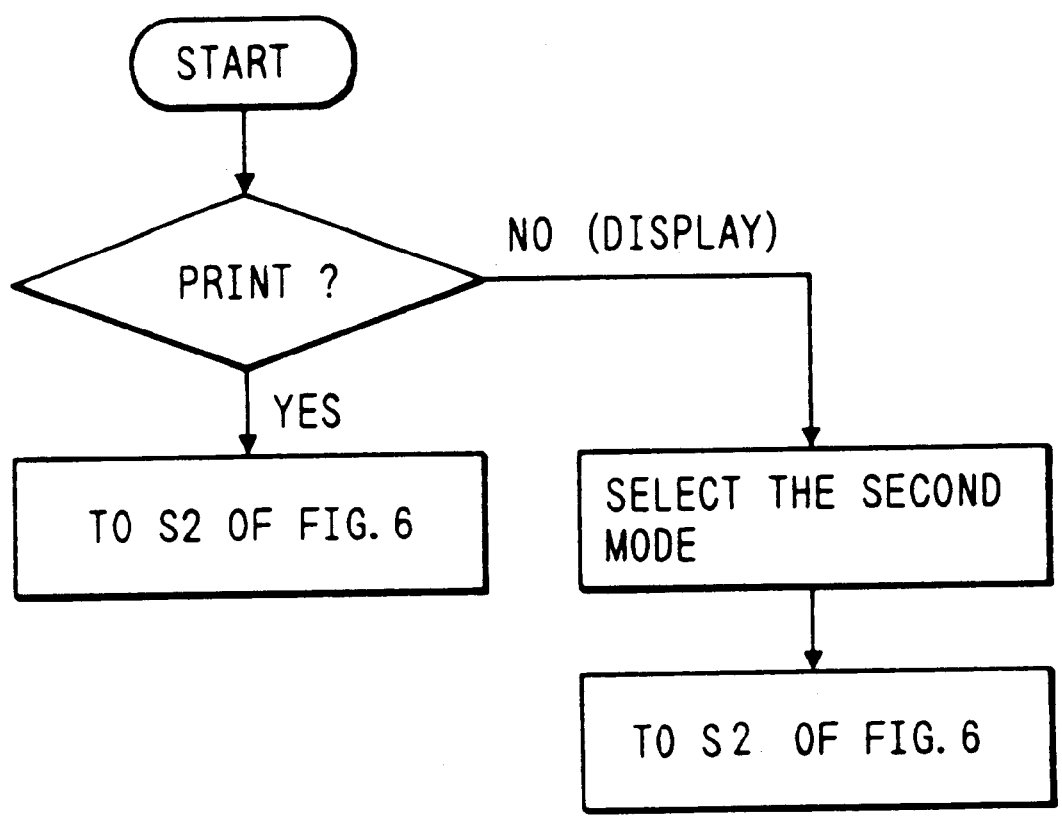
FIG. 7 is a flowchart for explaining the operation in another embodiment.

FIG. 7 shows a flowchart for explaining the processes as mentioned above.

A thinning-out ratio such as h/5, h/10, etc. can be also variably set into, for instance, h/8, . . . by a key input or the like (not shown).

As described above, it is possible to select the second print mode for reducing the number of outline points of the vector font and arranging into dots. The coordinate calculation, printing operation, and the like can be simplified as necessary. The whole processing time can be reduced.

Constructional Diagram of the Printer 2

Figure 8:
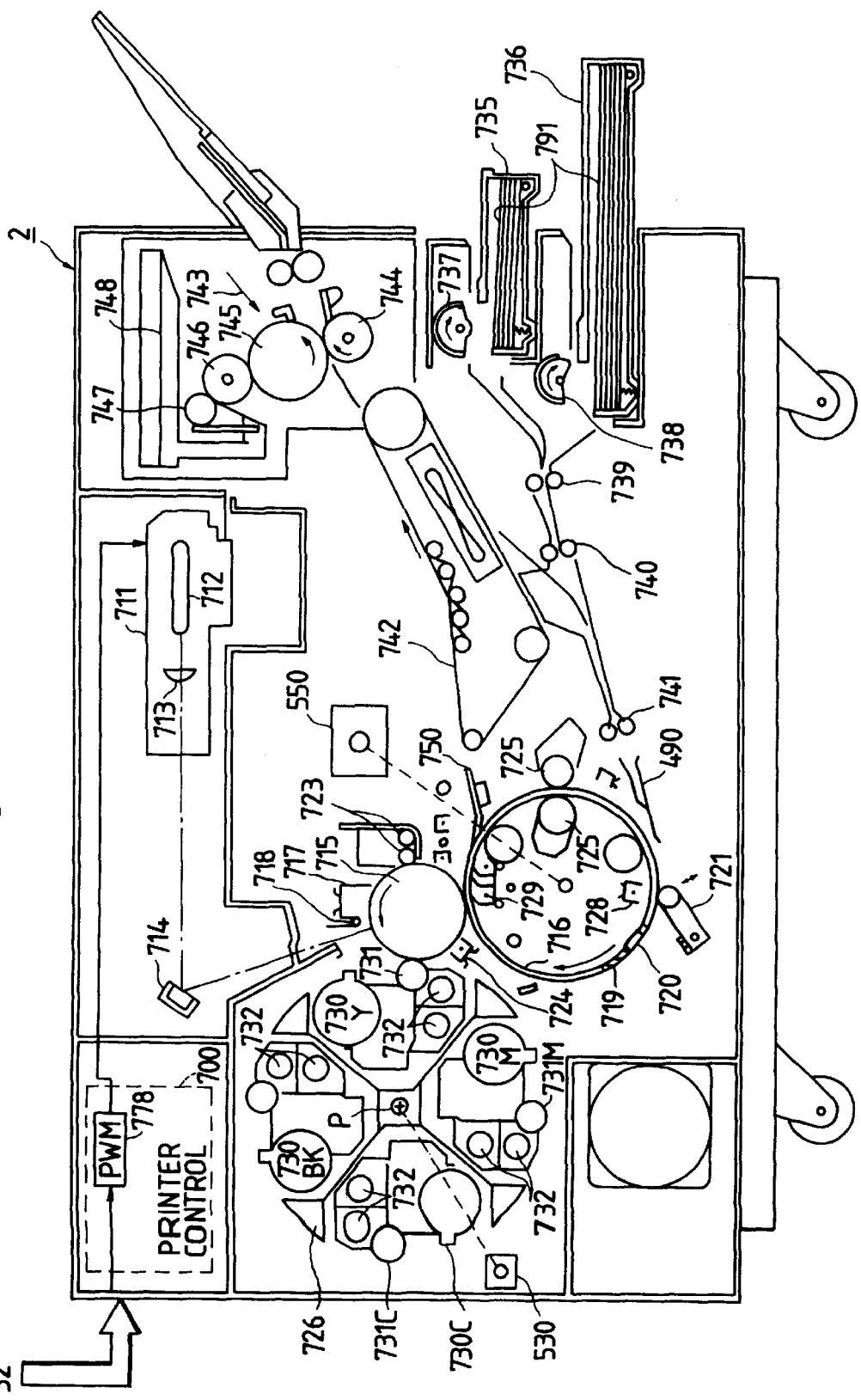
FIG. 8 is a diagram showing a structure of an output device 27.

An outline of the output device 27 shown in FIG. 1 will now be described with reference to FIG. 8. Reference numeral 778 denotes a pulse width modulator (PWM). The PWM 778 converts a digital image signal from the dot arranger 23 shown in FIG. 1 into an analog image signal and compares the analog image signal with a triangular wave of a predetermined period, thereby forming a pulse width modulation (PWM) signal. The PWM signal is supplied to a laser output device 711 at the post stage. The PWM signal is used to form a gradation image by on/off modulating a laser beam. Reference numeral 711 indicates a scanner comprising: a laser output device to convert the image signal from the PWM 778 into the photo signal; a polygonal mirror 712 of a polyhedron (for instance, octahedron); a motor (not shown) to rotate the mirror 712; an f/θ lens (image forming lens) 713; etc. Reference numeral 714 denotes a reflecting mirror to change a light path of a laser beam and 715 indicates a photo sensitive drum. The laser beam emitted from the laser output device is reflected by the polygonal mirror 712 and passes through the lens 713 and mirror 714 and linearly scans (raster scan) on the surface of the photo sensitive drum 715, thereby forming a latent image corresponding to an input image.

Reference numeral 717 denotes a primary charging device; 718 a whole surface exposing lamp; 723 a cleaner section to collect the residual toner which was not copy transferred; and 724 a pre-copy transfer charging device. These components are arranged around the photo sensitive drum 715.

Reference numeral 726 denotes a developing unit to develope an electrostatic latent image formed on the surface of the photo sensitive drum 715 by the laser exposure; 731Y, 731M, 731C and 731B*k* indicate developing sleeves which come into contact with the drum 715 and directly develop the latent image; 730Y, 730M, 730C, and 730B*k* represent toner hoppers to keep spare toners; and 732 screws to transport the developing agent. The developing unit 726 consists of the sleeves 731Y to 731B*k*, toner hoppers 730Y to 730B*k*, and screws 732. These components are arranged around a rotary shaft P of the developing unit. For instance, when a yellow toner image is formed, the yellow toner development is executed at the position shown in the diagram. When a magenta toner image is formed, the developing unit 726 is rotated around the shaft P in the diagram as a rotational center, thereby setting the developing sleeve 731M in the magenta developing device to the position which comes into contact with the photo sensitive drum 715. Cyan and black toner images are also formed in a manner similar to the above.

Reference numeral 716 indicates a copy transfer drum to copy transfer the toner image formed on the photo sensitive drum 715 onto a paper; 719 indicates an actuator plate to detect a moving position of the copy transfer drum 716; 720 a home position sensor to detect that the copy transfer drum 716 has moved to the home position by approaching the actuator plate 719; 725 a copy transfer drum cleaner; 727 a paper pressing roller; 728 a discharging device; and 729 a copy transfer charging device. The components 719, 720, 725, 727, 728 and 729 are arranged around the copy transfer drum 716.

On the other hand, reference numerals 735 and 736 denote paper feed cassettes to enclose papers (cut sheets); 737 and 738 indicate paper feed rollers to feed the papers from the cassettes 735 and 736; and 739, 740, and 741 represent timing rollers to match the timings for feeding and conveying the paper. The paper which was fed and conveyed through those components is led to a paper guide 749. A front edge of the paper is grasped by a gripper and is wrapped around the copy transfer drum 716. The processing routine advances to the image forming process.

Reference numeral 550 indicates a drum rotating motor for synchronously rotating the photo sensitive drum 715 and the copy transfer drum 716; 750 denotes a peeling-off claw to peel off the paper from the copy transfer drum 716 after completion of the image forming process; 742 a conveying belt to convey the paper which was peeled off; and 743 an image fixing section to fix the paper which was conveyed by the conveying belt 742. The image fixing section 743 has a pair of thermal pressure rollers 744 and 745.

What is claimed is:

1. An output apparatus comprising:

discrimination means for discriminating whether a draft mode is designated;

setting means for setting a first sampling width for generating a train of a first number of points representing a curve portion, if said discrimination means discriminates that the draft mode is not designated, and setting a second sampling width for generating a train of a second number of points representing the curve portion, if said discrimination means discriminates that the draft mode is designated, wherein the second number of points is smaller than the first number of points;

generating means for generating a train of points representing the curve portion based on control point information representing a character outline and based on the sampling width set by said setting means; and developing means for developing a dot pattern based on the point train generated by said generating means.

2. An apparatus according to claim 1, further comprising printer means for printing a pattern based on the dot pattern developed by said developing means.

3. An apparatus according to claim 1, further comprising display means for displaying a pattern based on the dot pattern developed by said developing means.

4. An apparatus according to claim 1, wherein the control point information comprises vector font information.

5. An apparatus according to claim 1, wherein the draft mode is designated upon displaying a character on a display device, and is not designated upon printing a character by a printer.

6. An apparatus according to claim 1, further comprising designation means for designating the draft mode.

7. An output method comprising the steps of:

discriminating whether a draft mode is designated;

if said discrimination step discriminates that the draft mode is not designated, setting a first sampling width for generating a train of a first number of points representing a curve portion;

if said discrimination step discriminates that the draft mode is designated, setting a second sampling width for generating a train of a second number of points representing the curve portion, wherein the second number of points is smaller than the first number of points;

generating a train of points representing the curve portion based on control point information representing a character outline and based on the sampling width set in said setting step; and developing a dot pattern based on the point train generated in said generating step.

8. A method according to claim 7, further comprising a step of printing a pattern based on the dot pattern developed in said developing step.

9. A method according to claim 7, further comprising a step of displaying a pattern based on the dot pattern developed in said developing step.

10. A method according to claim 7, wherein the control point information comprises vector font information.

11. A method according to claim 7, wherein the draft mode is designated upon displaying a character on a display device, and is not designated upon printing a character by a printer.

12. A method according to claim 7, further comprising the step of designating the draft mode.

13. A computer-useable medium storing computer-useable instructions for controlling an output apparatus, the instructions comprising instructions for:

discriminating whether a draft mode is designated;

if said discrimination step discriminates that the draft mode is not designated, setting a first sampling width for generating a train of a first number of points representing a curve portion;

if said discrimination step discriminates that the draft mode is designated, setting a second sampling width for generating a train of a second number of points representing the curve portion, wherein the second number of points is smaller than the first number of points;

generating a train of points representing the curve portion based on control point information representing a character outline and based on the sampling width set in said setting step; and developing a dot pattern based on the point train generated in said generating step.

14. A computer-useable medium according to claim 13, further comprising a step of printing a pattern based on the dot pattern developed in said developing step.

15. A computer-useable medium according to claim 13, further comprising a step of displaying a pattern based on the dot pattern developed in said developing step.

16. A computer-useable medium according to claim 13, wherein the control point information comprises vector font information.

17. A computer-useable medium according to claim 13, wherein the draft mode is designated upon displaying a character on a display device, and is not designated upon printing a character by a printer.

18. A computer-useable medium according to claim 13, further comprising the step of designating the draft mode.

* * * * *

UNITED STATES PATENT AND TRADEMARK OFFICE
CERTIFICATE OF CORRECTION

PATENT NO.    : 6,048,116
DATED         : April 11, 2000
INVENTOR(S)   : Shuichi Kumada It is certified that error appears in the above-identified patent and that said Letters Patent is hereby corrected as shown below:

ON THE TITLE PAGE:

[56] References Cited,

Under U.S. PATENT DOCUMENTS

"5,073,953  12/1991  Kawanoto" should read
--"5,073,956  12/1991 Kawanoto"--; and
"Kotora" should read --Kotera--; and Under FOREIGN PATENT DOCUMENTS Insert: --0215664   03/1984 EPO
         0153584   09/1985 EPO
         0110380   06/1984 EPO
         86-04703  08/1984 PCT (WIPO)--.

COLUMN 2:
Line 44, "sampling" should read --a sampling--.

COLUMN 3:
Line 29, "be also" should read --also be--;
Line 35, "be also" should read --also be--;
Line 52, "be also" should read --also be--; and
Line 57, "be also" should read --also be--.

UNITED STATES PATENT AND TRADEMARK OFFICE
CERTIFICATE OF CORRECTION

PATENT NO.   :   6,048,116
DATED        :   April 11, 2000
INVENTOR(S)  :   SHUICHI KUMADA It is certified that error appears in the above-identified patent and that said Letters Patent is hereby corrected as shown below:

COLUMN 4:
Line 15, "photo sensitive" should read
         --photosensitive--;
Line 18, "photo" should read --photosensitive--;
Line 19, "sensitive" should be deleted;
Line 25, "photo sensitive" should read
         --photosensitive--;
Line 29, "photo sensitive" should read
         --photosensitive--;
Line 44, "photo sensitive" should read
         --photosensitive--; and
Line 48, "photo sensitive" should read
         --photosensitive--.

Signed and Sealed this

Twelfth Day of June, 2001

*Attest:*

*Attesting Officer*

NICHOLAS P. GODICI

*Acting Director of the United States Patent and Trademark Office*